United States Patent [19]
Dalton

[11] Patent Number: 5,908,144
[45] Date of Patent: Jun. 1, 1999

[54] COFFEE DISPENSER

[76] Inventor: Francis M. Dalton, 1926 S. 12th St., Omaha, Nebr. 68108

[21] Appl. No.: 08/963,696

[22] Filed: Nov. 4, 1997

[51] Int. Cl.[6] ........................................................ B67D 5/06
[52] U.S. Cl. ........................ 222/185.1; 222/282; 222/287; 222/310
[58] Field of Search .................................. 222/185.1, 287, 222/310, 305, 561, 282, 157, 156, 498, 511

[56] References Cited

U.S. PATENT DOCUMENTS

| | | | |
|---|---|---|---|
| D. 245,060 | 7/1977 | Hauenstein | D7/129 |
| D. 292,358 | 10/1987 | Cockrell | D7/50 |
| 1,656,980 | 1/1928 | Kronke | 222/336 |
| 3,185,190 | 5/1965 | Crawford | 222/336 |
| 4,053,087 | 10/1977 | Lack et al. | 222/278 |
| 4,130,149 | 12/1978 | Hausam | 141/358 |
| 4,162,751 | 7/1979 | Hetland et al. | 222/293 |
| 4,394,940 | 7/1983 | Peterson | 222/276 |
| 4,569,463 | 2/1986 | Pellegrino | 222/187 |
| 4,998,648 | 3/1991 | Contreras | 222/370 |
| 5,292,037 | 3/1994 | Held | 222/339 |
| 5,375,744 | 12/1994 | Henderson | 222/306 |
| 5,421,491 | 6/1995 | Tuvim et al. | 222/336 |
| 5,437,396 | 8/1995 | Russillo et al. | 222/185.1 |

*Primary Examiner*—Andres Kashnikow
*Assistant Examiner*—David Deal
*Attorney, Agent, or Firm*—Zarley, McKee, Thomte, Voorhees & Sease; Dennis L. Thomte

[57] ABSTRACT

A coffee dispenser includes a housing with a bin for holding coffee and a base with an upright wall for supporting the bin over the base. The bin includes a hopper in the lower end with a dispensing opening therein for dispensing coffee to a coffee filter located on the base. A volume control mechanism includes a slide plate with an opening therein slidably mounted under the hopper dispensing opening to cover a portion of the opening, to reduce the overall opening size. A shutter is mounted under the slide plate and is operable to open and close to thereby dispense coffee into a coffee filter. A trigger mechanism is connected to the shutter to repeatedly open and close the shutter for a uniform time period during each dispensing sequence.

7 Claims, 5 Drawing Sheets

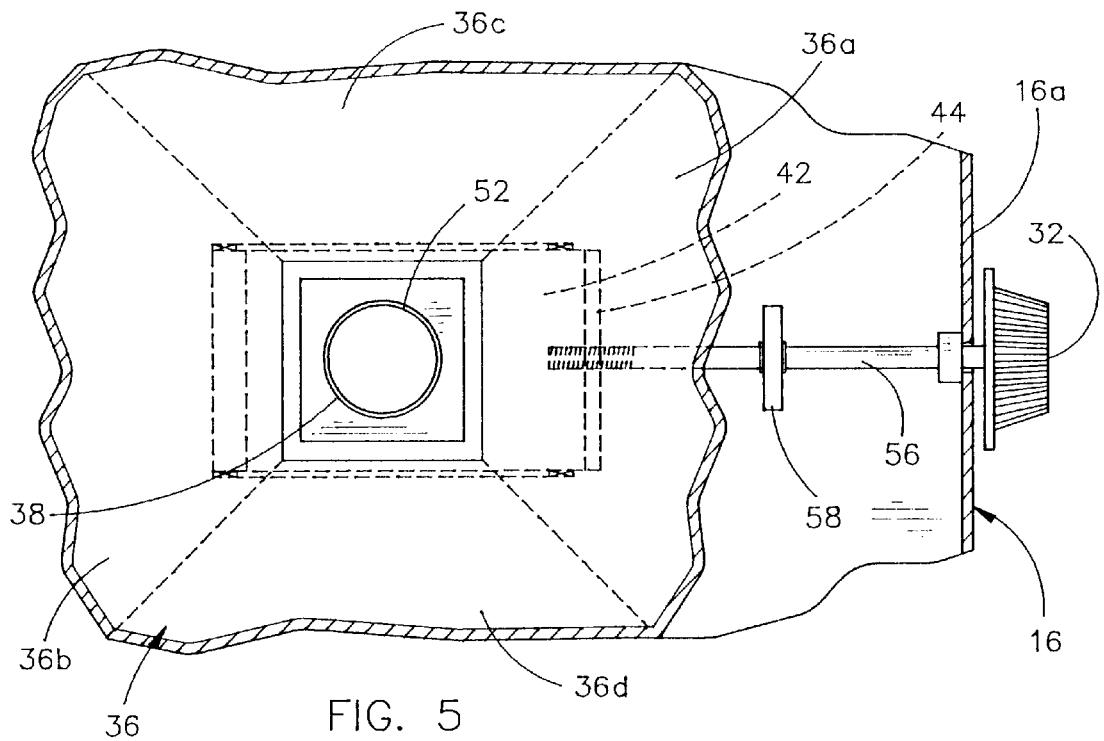
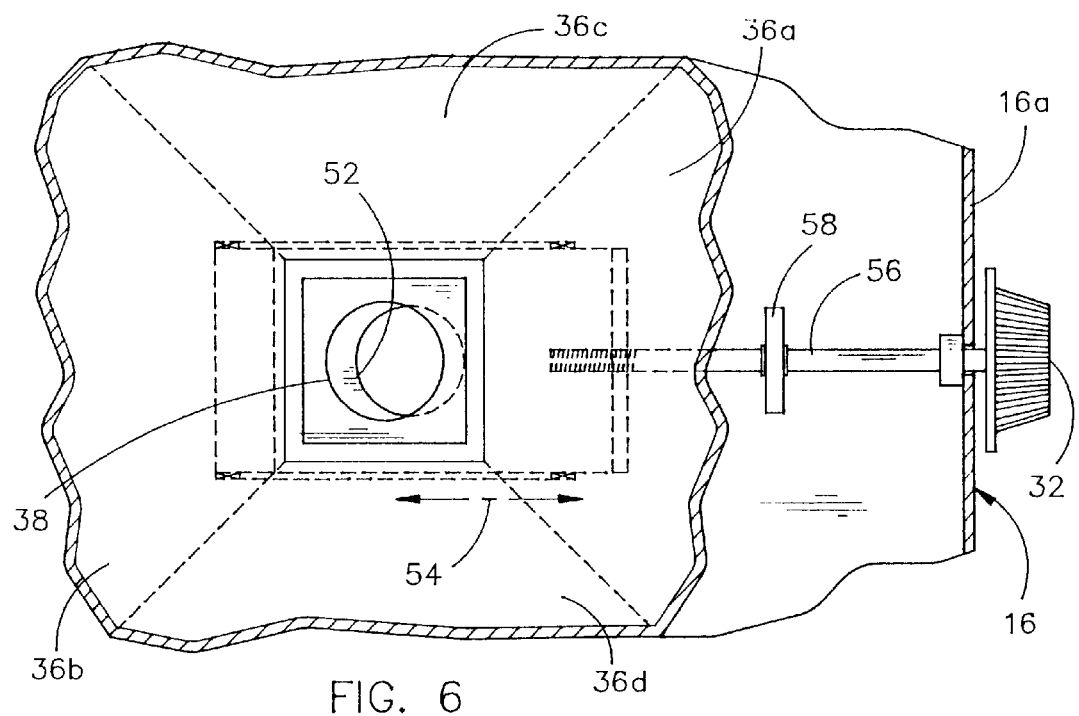

COFFEE DISPENSER

TECHNICAL FIELD

The present invention relates generally to dispensing apparatus, and more particularly to an improved coffee dispenser with an adjustable dispensing control.

BACKGROUND OF THE INVENTION

There have been a wide variety of apparatus in the prior art which were designed for dispensing granular materials, such as coffee. In general, these prior art devices dispense product into a hopper or similar apparatus which will hold a predetermined volume of material. This hopper is then utilized to dispense the predetermined quantity of material to the consumer. Examples of this type of device may be found in U.S. Pat. No. 4,053,087 to Lack et al., U.S. Pat. No. 4,998,648 to Contreras, U.S. Pat. No. 5,292,037 to Held, U.S. Pat. No. 5,421,491 to Tuvim et al., and U.S. Pat. No. 5,437,396 to Russillo et al.

In order to provide the dispenser with the capability of dispensing variable quantities of product, a number of mechanisms were developed to provide a hopper with an adjustable volume. Examples of such devices may be found in U.S. Pat. No. 4,130,149 to Hausam, U.S. Pat. No. 4,162,751 to Hetland et al., U.S. Pat. No. 4,394,940 to Peterson, U.S. Pat. No. 4,569,463 to Pellegrino, and U.S. Pat. No. 5,375,744 to Henderson.

While all of these devices were capable of fulfilling their intended purposes, they still suffer several drawbacks. First, the dispensing process was a two-step process, requiring the distribution of a quantity of product into a hopper, and then a second step of dispensing the contents of the hopper to the consumer. This two-step process complicates the mechanism, and increases the cost to produce the device.

In addition, many of the devices either require more than one hopper, of varying size, or a complicated variable volume hopper, in order to distribute a variety of different volumes of product. Again, the use of a plurality of hoppers, or the use of a variable volume hopper, required complicated apparatus to achieve its purpose. Thus, the prior art devices tended to be relatively expensive to produce and maintain.

SUMMARY OF THE INVENTION

It is therefore a general object of the present invention to provide an improved coffee dispenser with a variable volume control.

Another object of the present invention is to provide an improved coffee dispenser which permits adjustment of the volume dispensed without requiring hoppers of different dimensions.

Still another object is to provide a coffee dispenser which dispenses product in a single step.

Yet another object of the present invention is to provide an improved coffee dispenser which is economical to manufacture, simple to use, and refined in appearance.

These and other objects of the present invention will be apparent to those skilled in the art.

The coffee dispenser of the present invention includes a housing with a bin for holding coffee and a base with an upright wall for supporting the bin over the base. The bin includes a hopper in the lower end with a dispensing opening therein for dispensing coffee to a coffee filter located on the base. A volume control mechanism includes a slide plate with an opening therein slidably mounted under the hopper dispensing opening to cover a portion of the opening, to reduce the overall opening size. A shutter is mounted under the slide plate and is operable to open and close to thereby dispense coffee into a coffee filter. A trigger mechanism is connected to the shutter to repeatedly open and close the shutter for a uniform time period during each dispensing sequence.

BRIEF DESCRIPTION OF THE DRAWINGS

FIG. 5 is a horizontal sectional view looking downwardly at lines 5—5 in FIG. 1;

FIG. 6 is a sectional view similar to FIG. 5, but showing the volume control moved to a second position;

DESCRIPTION OF THE PREFERRED EMBODIMENT

Figure 1:
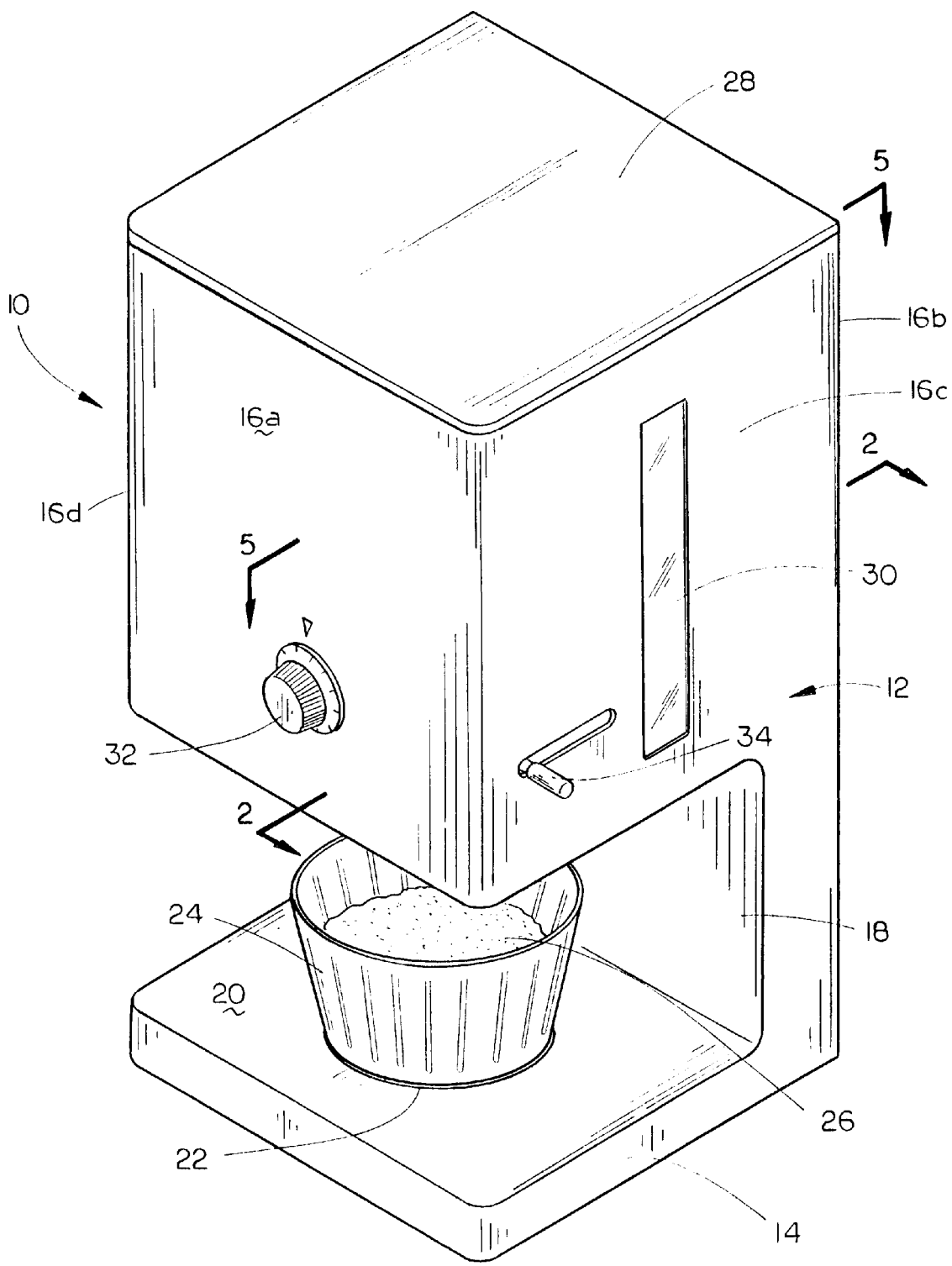
FIG. 1 is a perspective view of the coffee dispenser of the present invention.

Referring now to the drawings, in which similar or corresponding parts are identified with the same reference numeral and more particularly to FIG. 1, the coffee dispenser of the present invention is designated generally at 10 and includes a housing 12 having a base 14 and a storage bin 16 supported on base 14 by an upright support wall 18.

Base 14 is a generally planar member with an upper support surface 20 having a circular depression 22 located generally centrally thereon. Depression 22 will retain a conventional coffee filter 24 in the desired position under the storage bin 16, so as to receive ground coffee 26 therein.

Storage bin 16 is preferably a rectangular enclosed structure having a forward wall 16a, rearward wall 16b, side walls 16c and 16d, and a removable lid 28. A site glass 30 is preferably formed in at least one side wall 16c to permit viewing of the contents of storage bin 16.

A volume control knob 32 is operably mounted on front wall 16a of bin 16, and is used to select the quantity of coffee 26 to be dispensed. A dispensing trigger 34 is operably mounted through side wall 16c, to selectively trigger the dispensing of a quantity of coffee 26, as described in more detail hereinbelow. Support wall 18 also serves as a rearward wall, for supporting bin 16 above base 14. Support wall 18 may be of any desired height, sufficient to permit a standard filter 24 to be introduced between bin 16 and base 14, but not so high as to cause coffee to spill or splatter out of the filter during the dispensing process.

Figure 3:
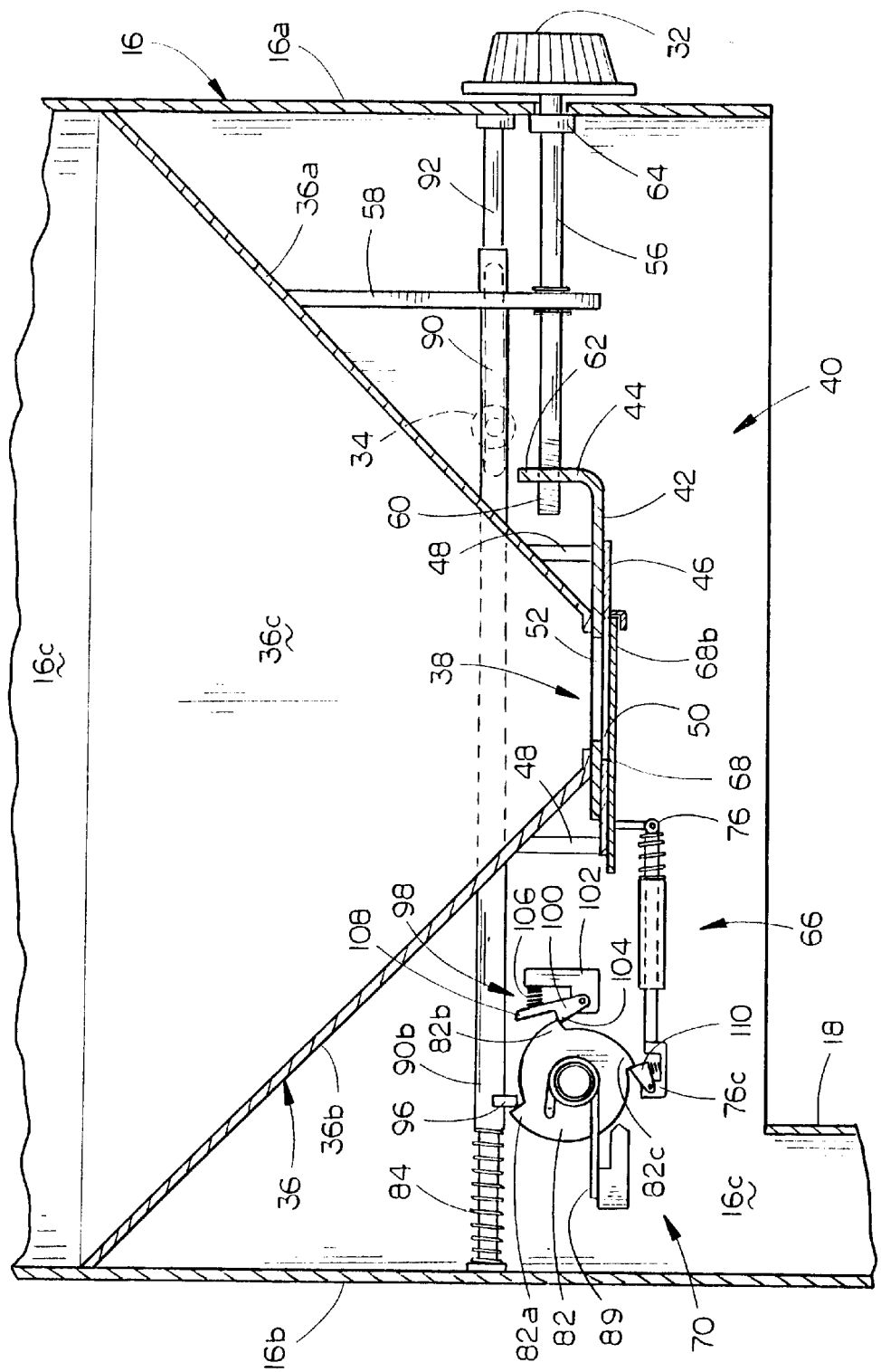
FIG. 3 is a view similar to FIG. 2, showing the actuator mechanism in a second position.

Referring now to FIGS. 3, 5, and 6, it can be seen that a hopper 36 having funnel-shaped walls is mounted in the lower end of bin 16. Hopper 36 includes forward and rearward sloped walls 36a and 36b, and opposing sloped side walls 36c and 36d. Funnel walls 36a, 36b, 36c, and 36d slope downwardly and inwardly to a circular dispensing opening 38 at the lower end of hopper 36. Preferably, bin 16 and hopper 36 have dimensions sufficient to store a conventional two pound container of coffee therein. Although not shown, agitators or the like may be used to maintain the coffee in a flowable condition within bin 16.

Volume control knob 32 is connected to a volume control apparatus designated generally at 40 within bin 16 and connected to the exterior of hopper 36. Volume control apparatus 40 includes a slide plate 42 having an upwardly bent forward lip 44, slide plate 42 slidably disposed below opening 38 in hopper 36. Slide plate 42 is slidably mounted atop a horizontal support plate 46, which is supported below dispensing opening 38 by a plurality of support legs 48 depending from the hopper walls 36a, 36b, 36c, and 36d. Support plate 46 has a central opening 50 therein, larger than dispensing opening 38 and coaxial therewith. Slide plate 32 also has an aperture 52 formed therein, having a diameter the same or smaller than that of opening 38. As shown in FIGS. 5 and 6, movement of slide plate 42 forwardly and rearwardly (shown by arrow 54 in FIG. 6) will cause side plate aperture 52 to be moved out of coaxial alignment with dispensing opening 38, and thereby change the size of the opening through which the coffee will be dispensed. This change in the opening size will decrease the quantity of coffee dispensed during a dispensing operation, as described in more detail hereinbelow.

In order to slide slide plate 42 forwardly and rearwardly, volume control knob 32 is attached to the forward end of a shaft 56, to rotate the shaft either clockwise or counterclockwise on the longitudinal axis of the shaft. A strap 58 depending from hopper forward wall 36a has an aperture in the lower end thereof through which shaft 56 is journaled to support shaft 56 in a generally horizontal orientation. The rearward end 60 of shaft 56 is threaded, and engages a threaded aperture in lip 44. Thus, rotation of knob 32 will cause threaded end 60 of shaft 56 to engage the threaded aperture 62 in lip 44, and thereby move slide plate 42 forwardly or rearwardly. A stop 64 on shaft 56 adjacent bin forward wall 16a prevents shaft 56 from moving forwardly when knob 32 is rotated.

Referring now to FIGS. 2–4 and 7–8, a dispensing apparatus is designated generally at 66 and includes an operable shutter 68 for selectively uncovering the dispensing opening 38, and a trigger mechanism 70, for selectively moving the shutter for predetermined periods of time. In order to accurately dispense selectively adjustable quantities of coffee, trigger mechanism 70 must move shutters 68 from the closed position shown in FIGS. 2, 3, and 7, to the open position shown in FIGS. 4 and 8, and back to the closed position, at a consistent and uniform speed, so that dispensing opening 38 is uncovered for the same amount of time upon every activation of the dispensing trigger 34.

Figure 4:
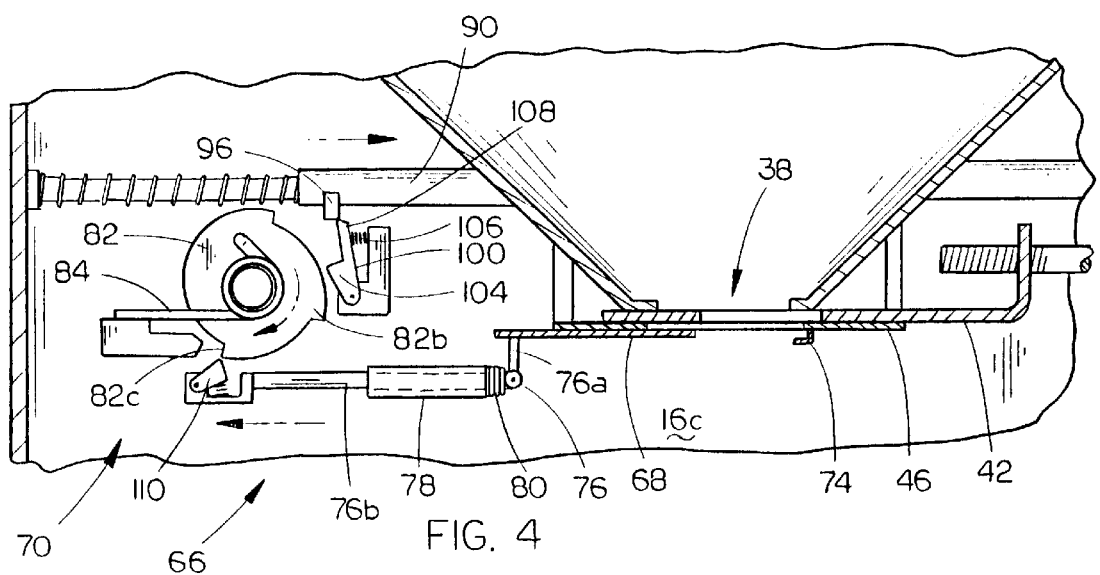
FIG. 4 is a sectional view similar to FIGS. 2 and 3, but with the actuator mechanism in a third position.
Figure 7:
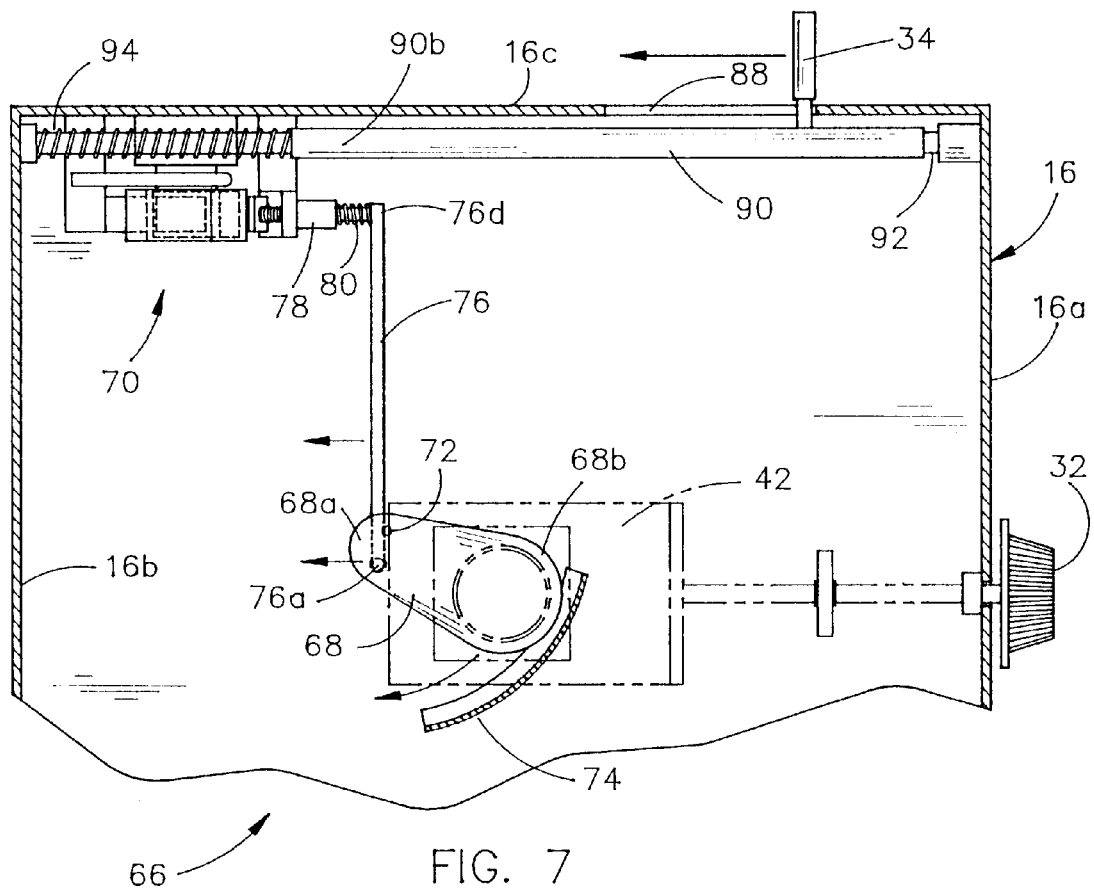
FIG. 7 is a view similar to FIGS. 5 and 6, showing the dispensing mechanism in a closed position.
Figure 8:
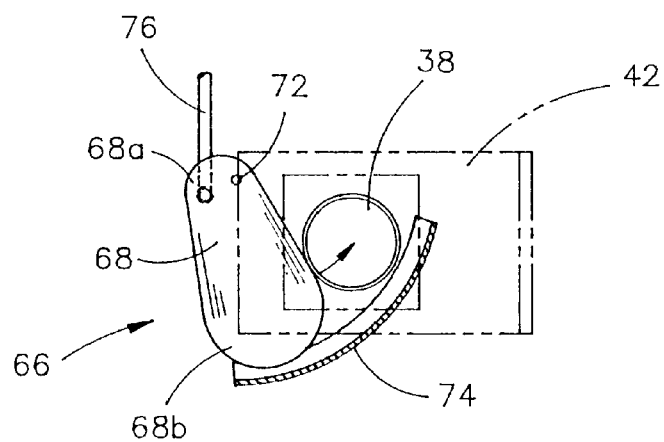
FIG. 8 is a view similar to FIG. 7, but showing the dispensing apparatus in a dispensing position.

As shown in FIGS. 7 and 8, shutter 68 is preferably generally teardrop shaped, with a smaller diameter pivot end 68a and a larger diameter cover end 68b. As shown in FIGS. 7 and 8, shutter 68 is mounted for pivotal movement on a pivot pin 72, located in the pivot end 68a of shutter 68. Pivot pin 72 has a vertical axis and is pivotally connected to the support plate 46 (shown in FIG. 3) to depend therefrom. The cover end 68b is slidably supported on an arcuate L-shaped flange 74, for slidable movement between the covered position of FIG. 7 to the uncovered position of FIG. 8. Flange 74 also depends from support plate 46, such that shutter 68 will pivot within the plane of the shutter, and in a plane parallel to the planes of support plate 46 and slide plate 42 (as shown in FIGS. 2–4).

A pivot arm 76 has a first end pivotally connected to shutter 68 at the pivot end 68a, proximal to but spaced away from pivot pin 72. As shown in FIGS. 7 and 8, only slight movement of pivot arm 76 forwardly and rearwardly will cause shutter 68 to move between the covered and uncovered positions, by pivoting the shutter on pivot pin 72. As shown in FIG. 7, pivot arm 76 extends from the first end 76a generally horizontally over towards bin side wall 16c, where trigger mechanism 70 is mounted. FIGS. 3, 4, and 5 more clearly show the trigger mechanism 70.

Figure 2:
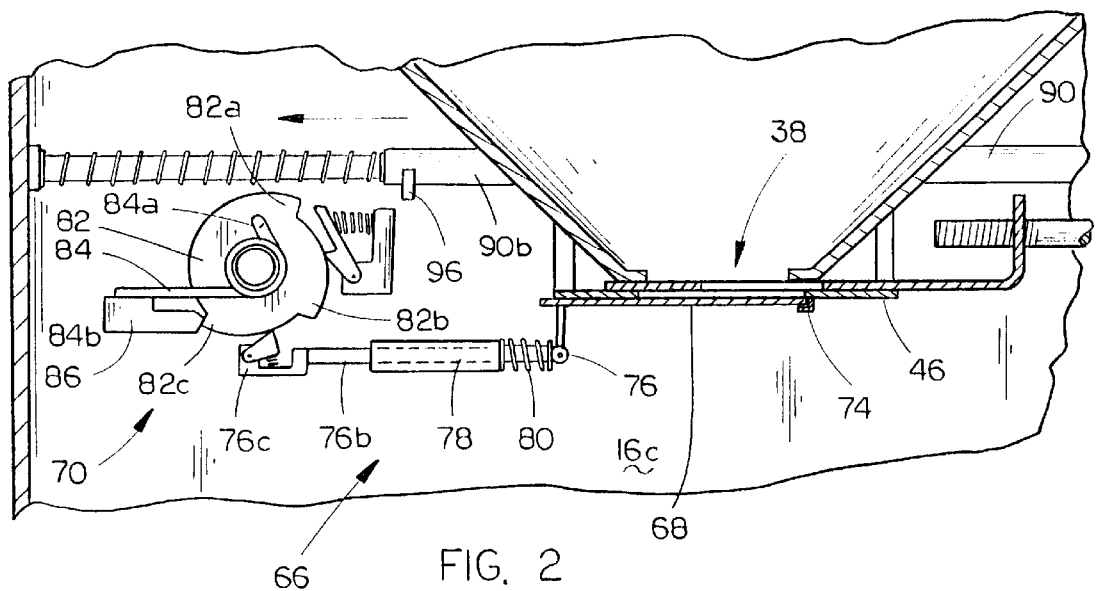
FIG. 2 is a vertical sectional view taken at lines 2—2 in FIG. 1.

As shown in FIG. 2, pivot arm 76 has a rearwardly extending leg 76b, parallel to bin side wall 16c. Leg 76b is journaled through a sleeve 78 for slidable movement therethrough, and terminates at a second end 76c, rearwardly of sleeve 78. A coil spring 80 between sleeve 78, and the elbow 76d (see FIG. 7) serves to provide a biasing force when leg 76b is moved rearwardly (as shown in FIG. 4).

A wheel 82 is rotatably mounted on bin side wall 16c, as shown in FIG. 2, and has three teeth 82a, 82b, and 82c around its periphery. A coil spring 84 has one end 84a connected to wheel 82, and the opposite end 84b biased against a stop 86 so as to apply a biasing force to rotate wheel 82 in a clockwise direction. Tooth 82c is located to contact stop 86 and prevent further rotational movement of wheel 82 beyond the "rest" position shown in FIG. 2.

Referring to FIG. 3 and 7, it can be seen that dispensing trigger 34 projects outwardly through a slot 88 in bin side wall 16c and is connected to an elongated tube 90 within bin 16. Tube 90 is slidably journaled on a rod 92 extending between bin forward and rearward walls 16a and 16b. A spring 94 on rod 92 between the rearward end 90b of tube 90 and rearward wall 16b, will provide a forward biasing force on tube 90 to return tube 90 to the "rest" position shown in FIGS. 2 and 7.

Referring once again to FIGS. 2 and 3, rearward end 90b of tube 90 has a depending finger 96 which will contact wheel first tooth 82a as tube 90 is moved rearwardly from the rest position shown in FIG. 2 to the "cocked" position shown in FIG. 3. As finger 96 contacts tooth 82a, it will rotate wheel 82 in a counterclockwise direction against the bias of spring 84, as shown in FIG. 3. A latch mechanism 98 will selectively retain wheel 82 in the "cocked" position, until released by finger 96 as described in more detail below.

Latch mechanism 98 includes a latch 100 pivotally mounted to a base block 102, and including a latch hook 104 projecting towards wheel 82. The hook portion 104 of latch 100 is maintained in contact with the circumferential surface of wheel 82 by a spring 106 mounted between an upwardly projecting trigger arm 108 on latch 100. As wheel 82 is rotated by finger 96 to the cocked position shown in FIG. 3, latch 100 will be biased towards wheel 82 until hook 104 catches on wheel second tooth 82b to retain the wheel 82 in the "cocked" position. Simultaneously, a spring loaded latch 110 on the second end 76c of pivot arm 76 will be biased into engagement with wheel third tooth 82c.

Referring now to FIG. 4, trigger mechanism 70 is activated by the return movement of tube 90 forwardly towards it "rest" position. This will move finger 96 into contact with latch trigger arm 108 and cause latch 100 to be moved forwardly against the bias of spring 106. This in turn releases latch hook 104 from wheel second tooth 82b permitting the wheel spring 84 to rotate wheel 82 in a clockwise direction. Clockwise movement of wheel 82 will pull pivot arm leg 76b rearwardly because of the contact of third tooth 82c with the pivot arm latch 110. Movement of pivot arm leg 76b will cause the pivot arm first end 76a to pivot shutter 68 to the open position shown in FIG. 4. Simultaneously, spring 80 will be compressed until wheel 82 continues to rotate to a position where third tooth 82c releases pivot arm latch 110.

The compressed spring 80 will then cause pivot arm 76 to return to its "rest" position with shutter 68 covering the dispensing opening 38.

Whereas the invention has been shown and described in connection with the preferred embodiment thereof, many modifications, substitutions and additions may be made which are within the intended broad scope of the appended claims.

I claim:

1. A dispensing apparatus, comprising:

a housing including a bin for holding and dispensing flowable material, a base for supporting the bin, and a support wall connected between the base and bin for supporting the bin vertically above the base;

said bin including a funnel-shaped hopper at a lower end thereof, with a dispensing opening in the lower end of the hopper;

a volume control mechanism operably mounted under the hopper with means for selectively adjustably covering at least a portion of the dispensing opening;

a shutter operably mounted below the means for selectively covering the dispensing opening, and operable between an open position revealing the dispensing opening, and a covered position completely covering the dispensing opening to thereby prevent dispensing of flowable material from the hopper; and a trigger mechanism operably mounted on the housing and having means for selectively performing a dispensing sequence, wherein the shutter is moved from the covered position, thence to the open position, and thence back to the covered position, said means for performing the dispensing sequence including means for repeating the sequence with the shutter in the open position for substantially the same amount of time during each repetition of the sequence.

2. The apparatus of claim 1, wherein said bin has forward and rearward walls, opposing side walls, and a removable lid.

3. The apparatus of claim 2, wherein at least one of said bin walls has a vertical site glass therein permitting viewing of the contents of the bin.

4. The apparatus of claim 3, wherein the volume control mechanism includes an adjustable knob mounted on an exterior of a wall of the bin, operable to adjust the amount of dispensing opening which is covered.

5. The apparatus of claim 4, wherein said base is a generally planar member with a circular depression in an upper face, for receiving and holding a coffee filter thereon.

6. The apparatus of claim 2, wherein the volume control mechanism includes an adjustable knob mounted on an exterior of a wall of the bin, operable to adjust the amount of dispensing opening which is covered.

7. The apparatus of claim 1, wherein said base is a generally planar member with a circular depression in an upper face, for receiving and holding a coffee filter thereon.

* * * * *